(12) United States Patent
Frey et al.

(10) Patent No.: US 12,551,003 B2
(45) Date of Patent: Feb. 17, 2026

(54) HEAD FOR A PERSONAL CARE DEVICE

(71) Applicant: Braun GmbH, Kronberg (DE)

(72) Inventors: Dominik Julian Frey, Frankfurt (DE); Alexander Hess, Margetshöchheim (DE)

(73) Assignee: Braun GmbH, Kronberg (DE)

( * ) Notice: Subject to any disclaimer, the term of this patent is extended or adjusted under 35 U.S.C. 154(b) by 561 days.

(21) Appl. No.: 17/950,646

(22) Filed: Sep. 22, 2022

(65) Prior Publication Data

US 2023/0097486 A1  Mar. 30, 2023

(30) Foreign Application Priority Data

Sep. 27, 2021  (EP) ..................................... 21199135

(51) Int. Cl.
*A46B 7/04* (2006.01)
*A46B 1/00* (2006.01)
(Continued)

(52) U.S. Cl.
CPC .................. *A46B 1/00* (2013.01); *A46B 7/04* (2013.01); *A46B 9/04* (2013.01); *A46B 13/02* (2013.01);
(Continued)

(58) Field of Classification Search
CPC .. A61C 17/22; A46B 3/22; A46B 9/28; A46B 7/04
See application file for complete search history.

(56) References Cited

U.S. PATENT DOCUMENTS 1,601,217 A * 9/1926 Jones ........................ A46B 3/08
15/190
2,273,717 A * 2/1942 Millard .................... A46B 9/04
15/207.2
(Continued)

FOREIGN PATENT DOCUMENTS

CN        2259084 Y     8/1997
CN        1504139 A     6/2004
(Continued)

OTHER PUBLICATIONS

CM05368FQ Extended EP Search Report and Written Opinion for 21199135.1 dated Feb. 28, 2022, 09 pages.
(Continued)

*Primary Examiner* — Michael D Jennings
(74) *Attorney, Agent, or Firm* — Jay A. Krebs

(57) ABSTRACT

A head for a personal care device having a carrier including a front surface, at least one cleaning element partly embedded in the carrier and thus having an embedded cleaning element portion and a non-embedded cleaning element portion extending from the front surface of the carrier between a base end on the front surface and a free end; the embedded cleaning element portion extending from the front surface between a top end on the front surface and a bottom end, wherein the base end of the non-embedded cleaning element portion has a base end cross-sectional shape and a base end cross-sectional area, and the top end of the embedded cleaning element portion has a top end cross-sectional shape that is different to the base end cross-sectional shape and a top end cross-sectional area that is larger than the base end cross-sectional area.

8 Claims, 6 Drawing Sheets

(51) Int. Cl.
    *A46B 9/04*         (2006.01)
    *A46B 13/02*       (2006.01)
    *A46D 1/00*        (2006.01)
    *A61C 17/22*       (2006.01)
    *B29C 45/00*       (2006.01)
    *B29C 45/16*       (2006.01)
    *A46B 3/04*        (2006.01)
    *B29K 21/00*       (2006.01)
    *B29L 31/42*       (2006.01)

(52) U.S. Cl.
    CPC ......... *A46D 1/0207* (2013.01); *A46D 1/0284* (2013.01); *A61C 17/222* (2013.01); *B29C 45/0001* (2013.01); *B29C 45/16* (2013.01); *A46B 3/04* (2013.01); *B29C 2045/1681* (2013.01); *B29K 2021/003* (2013.01); *B29L 2031/425* (2013.01)

(56) References Cited

U.S. PATENT DOCUMENTS

| | | | |
|---|---|---|---|
| 2,358,464 A * | 9/1944 | Mayer | A46B 3/16 15/190 |
| 2,363,647 A * | 11/1944 | Cosin | A46B 17/04 15/184 |
| 2,409,490 A * | 10/1946 | Jobst | A46B 3/16 15/190 |
| 2,482,928 A * | 9/1949 | Neff | A46B 3/22 15/186 |
| 2,488,873 A * | 11/1949 | Maynard | A46B 3/02 15/167.1 |
| 2,542,709 A * | 2/1951 | Rowland | A46B 3/16 15/205 |
| 2,882,544 A * | 4/1959 | Hadidian | A46B 7/06 401/268 |
| 2,923,598 A | 2/1960 | Reis, Jr. et al. | |
| 3,076,218 A | 2/1963 | Cook et al. | |
| 4,255,224 A | 3/1981 | Lorenz | |
| 4,697,851 A | 10/1987 | Takahashi | |
| 5,033,797 A | 7/1991 | Rueb | |
| 5,040,260 A | 8/1991 | Michaels | |
| 5,045,267 A | 9/1991 | Weihrauch | |
| 5,318,352 A * | 6/1994 | Holland | A46B 7/06 300/21 |
| 5,431,484 A | 7/1995 | Zahoransky et al. | |
| 5,823,633 A * | 10/1998 | Weihrauch | B29C 45/14385 300/8 |
| 5,974,619 A * | 11/1999 | Weihrauch | A46B 9/02 15/186 |
| 6,035,476 A * | 3/2000 | Underwood | A46B 9/045 15/22.1 |
| 6,036,277 A * | 3/2000 | Weihrauch | A46B 3/20 15/186 |
| 6,044,514 A | 4/2000 | Kaneda et al. | |
| 6,402,494 B1 | 6/2002 | Lanvers | |
| 6,726,789 B1 | 4/2004 | Weihrauch | |
| 6,735,803 B2 | 5/2004 | Kuo | |
| 6,779,851 B2 | 8/2004 | Bouchiere | |
| 6,862,771 B1 | 3/2005 | Muller | |
| 6,865,767 B1 | 3/2005 | Gavney, Jr. | |
| 7,162,767 B2 | 1/2007 | Pfenniger et al. | |
| 7,174,596 B2 | 2/2007 | Fischer et al. | |
| 7,281,768 B2 * | 10/2007 | Sato | A46B 3/02 300/4 |
| 7,434,288 B2 | 10/2008 | Gavney, Jr. | |
| 7,644,466 B2 | 1/2010 | Weihrauch et al. | |
| 7,814,604 B2 | 10/2010 | Gavney, Jr. | |
| 7,861,356 B2 | 1/2011 | Kunath et al. | |
| 8,132,284 B1 | 3/2012 | Kraemer | |
| 8,434,190 B2 * | 5/2013 | Stief | A46D 1/00 15/186 |
| 8,677,542 B1 * | 3/2014 | Whillock | A46B 5/0095 15/22.1 |
| 8,677,545 B2 | 3/2014 | Vitt et al. | |
| 9,144,299 B2 | 9/2015 | Fritsch et al. | |
| 9,398,802 B2 | 7/2016 | Moskovich et al. | |
| 9,402,461 B2 | 8/2016 | Brik | |
| 9,635,928 B2 | 5/2017 | Morgott | |
| 9,636,898 B2 | 5/2017 | Ganninger | |
| 9,750,334 B2 | 9/2017 | Kirchhofer et al. | |
| 10,548,392 B2 * | 2/2020 | Robinson | A46B 9/04 |
| 2001/0023516 A1 | 9/2001 | Driesen et al. | |
| 2002/0152570 A1 | 10/2002 | Hohlbein | |
| 2003/0159224 A1 | 8/2003 | Fischer et al. | |
| 2004/0117934 A1 | 6/2004 | Pfenniger | |
| 2005/0015904 A1 | 1/2005 | Gavney | |
| 2005/0060826 A1 | 3/2005 | Gavney | |
| 2005/0155172 A1 | 7/2005 | Gavney | |
| 2005/0160546 A1 | 7/2005 | Weihrauch | |
| 2005/0193512 A1 | 9/2005 | Moskovich et al. | |
| 2006/0080795 A1 | 4/2006 | Pfenniger et al. | |
| 2006/0129171 A1 | 6/2006 | Moskovich | |
| 2006/0230563 A1 | 10/2006 | Gavney, Jr. | |
| 2007/0094824 A1 | 5/2007 | Pfenniger et al. | |
| 2007/0256263 A1 | 11/2007 | Kunath et al. | |
| 2008/0104785 A1 * | 5/2008 | Robinson | A46B 3/16 15/207.2 |
| 2009/0193604 A1 | 8/2009 | Pfenniger et al. | |
| 2009/0229064 A1 * | 9/2009 | Robinson | A46D 1/055 15/191.1 |
| 2011/0000041 A1 | 1/2011 | Vitt et al. | |
| 2011/0010881 A1 | 1/2011 | Pfenniger et al. | |
| 2011/0030158 A1 | 2/2011 | Gavney, Jr. | |
| 2011/0258797 A1 | 10/2011 | Shi et al. | |
| 2011/0304194 A1 | 12/2011 | Uchida et al. | |
| 2012/0011673 A1 * | 1/2012 | Claire-Zimmet | A46B 15/0081 15/167.1 |
| 2012/0091784 A1 | 4/2012 | Sakurai et al. | |
| 2012/0246857 A1 | 10/2012 | Kato et al. | |
| 2012/0317737 A1 | 12/2012 | Birk | |
| 2012/0317738 A1 | 12/2012 | Birk | |
| 2013/0019425 A1 | 1/2013 | Bresselschmidt | |
| 2013/0139338 A1 | 6/2013 | Hess et al. | |
| 2013/0180069 A1 | 7/2013 | Pfenniger et al. | |
| 2013/0241267 A1 | 9/2013 | Kumpf | |
| 2013/0291320 A1 | 11/2013 | Kirchhofer et al. | |
| 2013/0326834 A1 | 12/2013 | Vankov | |
| 2014/0075696 A1 | 3/2014 | Pfenniger et al. | |
| 2014/0123423 A1 | 5/2014 | Morgott | |
| 2014/0232173 A1 | 8/2014 | Birk | |
| 2014/0352093 A1 | 12/2014 | Bresselschmidt et al. | |
| 2014/0359956 A1 | 12/2014 | Jungnickel et al. | |
| 2014/0359957 A1 | 12/2014 | Jungnickel | |
| 2015/0097309 A1 | 4/2015 | Newman et al. | |
| 2015/0150369 A1 | 6/2015 | Bresselschmidt | |
| 2015/0238004 A1 | 8/2015 | Brik | |
| 2015/0257525 A1 | 9/2015 | Kang et al. | |
| 2016/0088925 A1 | 3/2016 | Pfenniger et al. | |
| 2017/0020278 A1 | 1/2017 | Xi et al. | |
| 2017/0128178 A1 | 5/2017 | Schmidt et al. | |
| 2017/0135462 A1 | 5/2017 | Willi et al. | |
| 2017/0215567 A1 | 8/2017 | Waguespack | |
| 2017/0318947 A1 | 11/2017 | Kirchhofer et al. | |
| 2017/0367474 A1 | 12/2017 | Machlitt et al. | |
| 2018/0000236 A1 | 1/2018 | Scheurich | |
| 2018/0289140 A1 | 10/2018 | Dengler | |
| 2019/0150601 A1 * | 5/2019 | Robinson | A46B 9/04 |
| 2019/0350354 A1 * | 11/2019 | Watcharotone | A46D 1/0276 |
| 2020/0107919 A1 | 4/2020 | Dengler et al. | |
| 2020/0397130 A1 | 12/2020 | Ganninger et al. | |
| 2020/0397134 A1 | 12/2020 | Ganninger et al. | |
| 2020/0397135 A1 | 12/2020 | Ganninger et al. | |
| 2020/0397136 A1 | 12/2020 | Ganninger et al. | |
| 2020/0397137 A1 | 12/2020 | Ganninger et al. | |
| 2021/0068526 A1 | 3/2021 | Kim | |
| 2022/0192356 A1 | 6/2022 | Jimenez et al. | |

FOREIGN PATENT DOCUMENTS

| | | |
|---|---|---|
| CN | 101081123 A | 12/2007 |
| CN | 101332012 A | 12/2008 |
| CN | 101668454 A | 3/2010 |

(56) References Cited

FOREIGN PATENT DOCUMENTS

| | | | |
|---|---|---|---|
| CN | 101674751 A | 3/2010 | |
| CN | 102245052 A | 11/2011 | |
| CN | 102824023 A | 12/2012 | |
| CN | 103260463 A | 8/2013 | |
| CN | 107645917 A | 1/2018 | |
| CN | 109414106 A | 3/2019 | |
| DE | 941364 C | 4/1956 | |
| DE | 19745024 A1 | 4/1999 | |
| DE | 10217527 A1 | 11/2003 | |
| DE | 102009039514 A1 | 3/2011 | |
| DE | 102012021311 A1 | 4/2014 | |
| EP | 1726237 A1 | 11/2006 | |
| EP | 1864588 A2 | 12/2007 | |
| EP | 2243394 A1 | 10/2010 | |
| EP | 2810581 B1 | 12/2014 | |
| EP | 3138437 A1 * | 3/2017 | ........... A46B 5/0095 |
| GB | 601371 A | 5/1948 | |
| JP | H0580324 U | 11/1993 | |
| JP | H0956479 A | 3/1997 | |
| JP | 2003061753 A | 3/2003 | |
| JP | 2003144232 A | 5/2003 | |
| JP | 2011131087 A | 7/2011 | |
| JP | 3172569 U | 12/2011 | |
| JP | 6423630 B2 | 10/2018 | |
| KR | 20060026646 A | 3/2006 | |
| WO | 2005115196 A2 | 12/2005 | |
| WO | 2007051099 A2 | 5/2007 | |
| WO | 2010025820 A2 | 3/2010 | |
| WO | 2011070549 A1 | 6/2011 | |
| WO | 2012174066 A2 | 12/2012 | |
| WO | 2015085536 A1 | 6/2015 | |
| WO | 2015183272 A1 | 12/2015 | |
| WO | 2016014051 A1 | 1/2016 | |
| WO | 2019011599 | 1/2019 | |

OTHER PUBLICATIONS

All Office Actions, U.S. Appl. No. 16/898,313, filed Jun. 10, 2020.
All Office Actions, U.S. Appl. No. 16/898,344, filed Jun. 10, 2020.
All Office Actions, U.S. Appl. No. 16/898,359, filed Jun. 10, 2020.
All Office Actions, U.S. Appl. No. 16/898,372, filed Jun. 10, 2020.
All Office Actions, U.S. Appl. No. 16/898,382, filed Jun. 10, 2020.
All Office Actions, U.S. Appl. No. 15/634,813, filed Jun. 27, 2017.
All Office Actions, U.S. Appl. No. 15/634,950, filed Jun. 27, 2017.
All Office Actions; U.S. Appl. No. 18/111,203, filed Feb. 17, 2023.
All Office Actions; U.S. Appl. No. 18/113,141, filed Feb. 23, 2023.
CM05368Q PCT Search Report and Written Opinion for PCT/IB2022/058453 dated Nov. 23, 2022,14 pages.
Unpublished U.S. Appl. No. 18/111,203, filed Feb. 17, 2023, to Jochen Ganninger et. al.
Unpublished U.S. Appl. No. 18/113,141, filed Feb. 23, 2023, to Jochen Ganninger et. al.
All Office Actions; U.S. Appl. No. 18/215,256, filed Jun. 28, 2023.
Unpublished U.S. Appl. No. 18/215,256, filed Jun. 28, 2023, to Jochen Ganninger et. al.

* cited by examiner

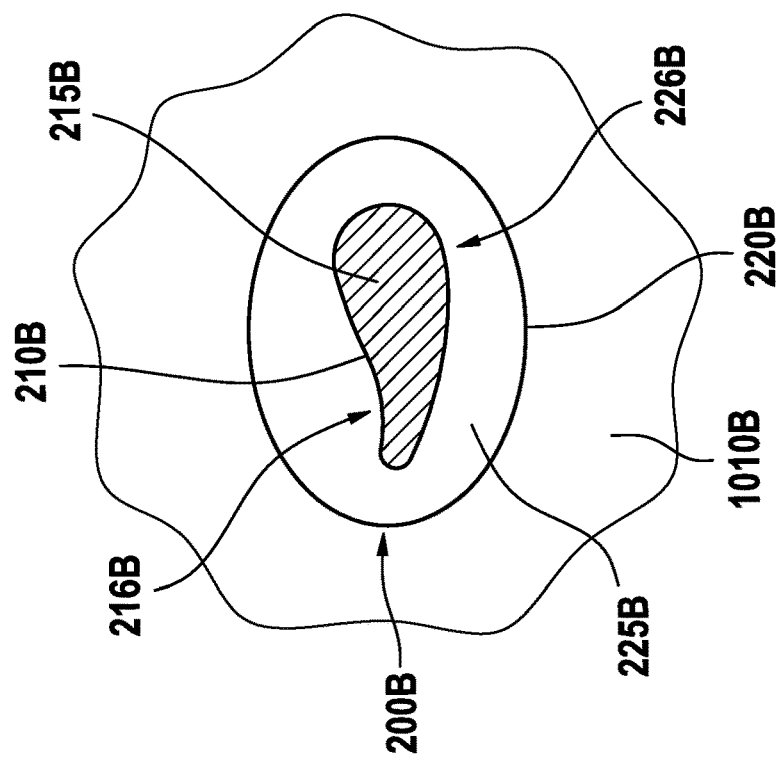
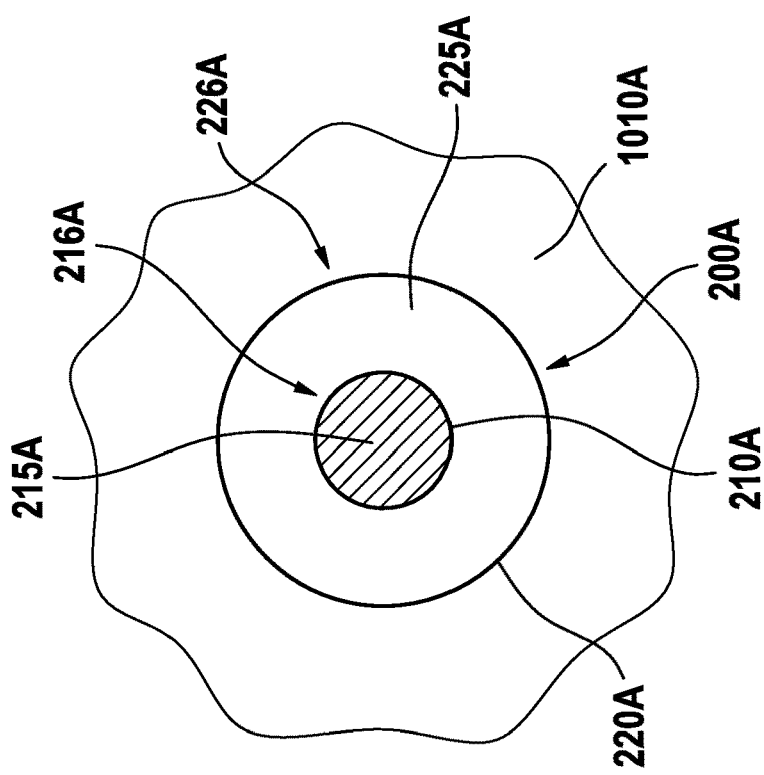

HEAD FOR A PERSONAL CARE DEVICE

FIELD OF THE INVENTION

The present disclosure is concerned with a head for a personal care device, which head comprises a carrier and at least one cleaning element.

BACKGROUND OF THE INVENTION

It is known that a head for a personal care device such as a cleaning head for an electric toothbrush comprises cleaning elements and specifically can comprises cleaning elements made from injection molded plastic material.

There is a general object to provide a head for a personal care device comprising at least one cleaning element that is improved over previously known heads. There is also a general object to provide a method for making such a head.

SUMMARY OF THE INVENTION

In accordance with at least one aspect, a head for a personal care device is provided that comprises a carrier having a front surface, at least one cleaning element partly embedded in the carrier and thus having an embedded cleaning element portion and a non-embedded cleaning element portion, the non-embedded cleaning element portion extending from the front surface of the carrier between a base end on the front surface and a free end and the embedded cleaning element portion extending from the front surface between a top end on the front surface and a bottom end, wherein the base end of the non-embedded cleaning element portion has a base end cross-sectional shape and a base end cross-sectional area, and the top end of the embedded cleaning element portion has a top end cross-sectional shape that is different to the base end cross-sectional shape and a top end cross-sectional area that is larger than the base end cross-sectional area.

In accordance with at least one aspect, a method for making a head for a personal care device is provided that comprises the steps of
  providing a first cavity in a mold for defining a front portion of a carrier, the mold comprising at least one pin for defining a through-hole in the front portion of the carrier, the through hole having a top end and a bottom end;
  injection molding of the front portion of the carrier;
  providing a second cavity in a mold comprising the front portion of the carrier as an insert, the second cavity comprising at least one cavity portion defining a non-embedded portion of a cleaning element, which cavity portion is an extension of the through-hole in the front portion of the carrier, wherein the cavity portion has a base end having a base end cross-sectional shape and a base end cross-sectional area and the top end of the trough-hole adjacent the base end of the cavity portion that has a top end cross-sectional area that is larger than the base end cross-sectional area, and preferably has a top end cross-sectional shape different to the base end cross-sectional shape;
  injection molding of at least one cleaning element that fills the cavity portion and the through-hole;
  providing a third cavity comprising the front portion of the carrier with the injection molded cleaning element as an insert and a cavity portion defining a back portion of the carrier; and
  injection molding of the back portion of the carrier.

BRIEF DESCRIPTION OF THE DRAWINGS

The present disclosure will be further elucidated by a detailed description of example embodiments and with reference to figures. In the figures
FIG. 2A is a cross-sectional cut through a first example cleaning element taken along the front surface of a head for a personal care device;
FIG. 2B is a cross-sectional cut through a first example cleaning element taken along the front surface of a head for a personal care device.

DETAILED DESCRIPTION OF THE INVENTION

Figure 1:
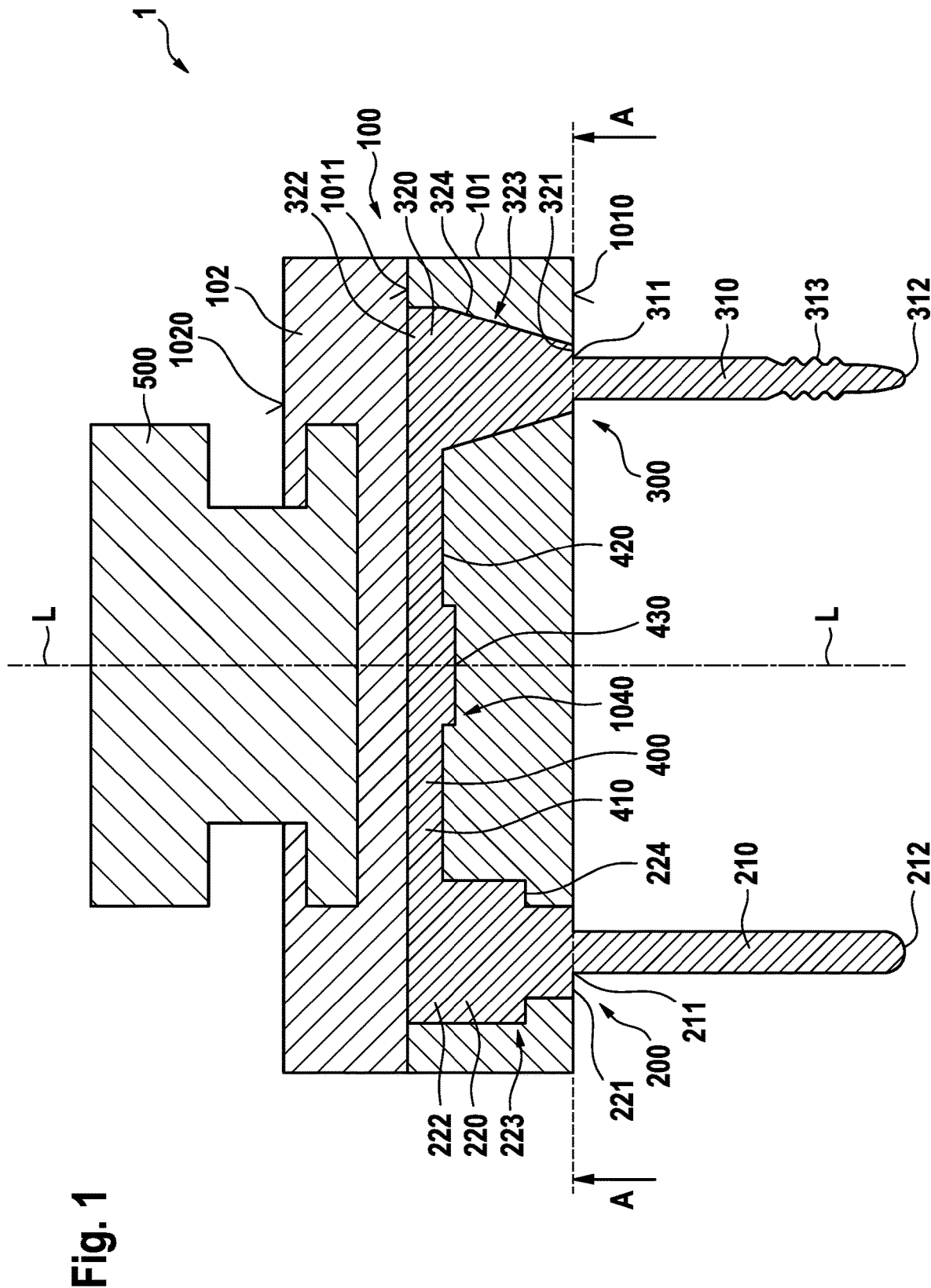
FIG. 1 is a cross-sectional cut through an example head in accordance with the present disclosure.

In the context of the present description "personal care" shall mean the nurture (or care) of the skin and of its adnexa (i.e., hairs and nails) and of the teeth and the oral cavity (including the tongue, the gums etc.), where the aim is on the one hand the prevention of illnesses and the maintenance and strengthening of health and on the other hand the cosmetic treatment and improvement of the appearance of the skin and its adnexa. It shall include the maintenance and strengthening of wellbeing. This includes skin care, hair care, and oral care as well as nail care. This further includes grooming activities such as beard care, shaving, and depilation. A "personal care device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal care device may have a more pronounced benefit in one or several of these nurturing or device areas than in one or several other of these areas. In the present description, an electric toothbrush was chosen to present details of the proposed personal care device. To the extent in which the details are not specific for an electric toothbrush, the proposed technology can be used in any other personal care device.

In accordance with the present disclosure, a head for a personal care device comprises at least one cleaning element and may comprise at least one or a plurality of further cleaning elements. In the present disclosure, the cleaning elements as discussed are named "cleaning element" and "further cleaning element". They could also have been named "first cleaning element" and "second cleaning element"—there is no difference to be seen in this naming convention. A cleaning element as described herein has an embedded cleaning element portion that extends within a carrier of the head and a non-embedded cleaning element portion that extends outside of the carrier. The cleaning element is understood to be an integral cleaning element, i.e., a cleaning element that is a one-piece element. This shall not exclude that a head in accordance with the present description has other non-integral elements suitable for cleaning, e.g., tufts assembled from a plurality of individual fibers, which are generally known in the art of brushes, e.g., toothbrushes or body brushes. It shall be understood that the carrier of the head has a front surface and that the non-embedded portion of the cleaning element extends from this front surface and that the portion of the cleaning element extending up to and below the front surface is the embedded portion of the cleaning element. For ease of presentability, the front surface of the carrier shown in the figures is a planar surface, but this shall not exclude that the front surface of the carrier is non-planar, specifically non-planar in the area of the cleaning element.

The carrier may be made from a plastic material, preferably a thermoplastic, where the plastic material may have a Young' modulus of above about 0.2 GPa, preferably of above about 1.0 GPa. The plastic material may be a polypropylene, a polycarbonate, a polyethylene or any other suitable thermoplastic.

In accordance with the present disclosure, the embedded portion of the at least one cleaning element has a top end that ends on the level of the front surface of the carrier and a bottom end that typically ends somewhere inside of the carrier, even though this shall not exclude that in some embodiments the bottom end ends at a back side of the carrier or even extends beyond such a back surface. The portion of the embedded portion of the cleaning element between the top end and the bottom end may be referred to as a middle portion of the embedded portion of the cleaning element. The top end of the embedded portion of the cleaning element has a top end cross-sectional area defined on the level of the front surface and has a top end cross-sectional shape. The non-embedded portion of the cleaning element extends from the front surface of the carrier between a base end that lies on the level of the front surface of the carrier and a free end. The base end of the embedded portion of the cleaning element has a base end cross-sectional area defined on the level of the front surface and base-end cross-sectional shape.

In accordance with the present disclosure and proposed head, the top end cross-sectional area of the embedded portion of the cleaning element is larger than the base end cross-sectional area of the non-embedded portion of the cleaning element. Preferably, the top end cross-sectional area is by at least 20% larger, preferably at least 30% or at least 40% or at least 50% or at least 60% or at least 70% or at least 80% or at least 100% larger than the base end cross-sectional area and on an absolute scale the larger top end cross-sectional area has a size of at least 3 $mm^2$, preferably at least 4 $mm^2$ or at least 5 $mm^2$ or at least 6 $mm^2$ or at least 7 $mm^2$ or at least 8 $mm^2$ or at least 9 $mm^2$ or at least 10 $mm^2$. The cleaning element as discussed here is an injection molded cleaning element and shall be secured at the carrier so that it cannot be easily removed, e.g., by biting on it while the head moves. The cleaning element shall thus have a retention force of at least 3 N, preferably of at least 4 N or at least 5 N. Several measures can be used to achieve a high retention force and the concept that is used here is a large top end cross-sectional area as this increases the contact area between the outer surface of the embedded portion of the cleaning element and the contacting surface of the carrier. The materials of at least the embedded portion of the cleaning element and of the carrier may be chosen such they form a chemical and/or physical bond when the cleaning element is injection molded. The material from which at least the embedded portion of the cleaning element is made may be a thermoplastic elastomer (TPE). The TPE may have a hardness of below about 60 Shore A, preferably of below about 50 Shore A or of below about 40 Shore A or of about 30 Shore A, where the Shore A hardness is measured in accordance with DIN ISO 7619-1. A soft TPE material leads to a relatively long elongation of the TPE cleaning element when a force is applied to rip it out. Further measures can be added to increase the retention force, specifically an undercut between the carrier and the embedded portion of the cleaning element with respect to the extracting direction. A further measure would be an essentially laterally extending arm that is connected with the bottom end of the embedded portion of the cleaning element, which arm may preferably connect the bottom end of the embedded portion of the cleaning element with a center point of the carrier and the arm may potentially also be connected with a bottom end of an embedded portion of a further cleaning element. It is also contemplated to provide a structure of at least a portion of the outer surface of the embedded portion that is in contact with the carrier in order to increase the overall contact area between the embedded portion and the carrier. The structure may be microscopic or macroscopic.

The mentioned undercut may preferably be created by a widening of the embedded portion of the cleaning element between the top-end towards the bottom end, preferably a widening occurring in a middle portion of the embedded portion of the cleaning element. With "widening" here a continuous widening is meant, i.e., a change from one cross-sectional area and shape to another cross-sectional area and shape occurring over a certain length so the latter cross-sectional area is larger. Instead of a continuous widening, a step-like widening may be provided in the middle portion of the embedded portion of the cleaning element. Both concepts may also be combined, i.e., a continuous widening and a widening step may both be used in combination, optionally each one or both concepts also in combination with a laterally extending arm.

A method of making a head in accordance with the present disclosure comprises the steps of:

providing a first cavity in a mold for defining a front portion of a carrier, the mold comprising at least one pin for defining a through-hole in the front portion of the carrier, the through hole having a top end at a front surface of the front portion of the carrier and a bottom end at a back side of the front portion of the carrier;

injection molding of the front portion of the carrier by filling the first mold cavity with a plastic material;

providing a second cavity in a mold (which may be the same mold as the mold used in the first step above) and comprising the front portion of the carrier as an insert (the front portion of the carrier may have been transferred into the second mold cavity of the front portion may just be remained in the first cavity), the second cavity comprising at least one cavity portion defining a non-embedded portion of a cleaning element (this cavity portion may have been occluded by the pin and thus may have been opened by retracting the pin), which cavity portion is an extension of the through-hole in the front portion of the carrier, wherein this cavity portion has a base end having a base end cross-sectional shape and a base end cross-sectional area and the top end of the trough-hole adjacent the base end of the cavity portion that has a top end cross-sectional area that is larger than the base end cross-sectional area, optionally wherein a top end cross-sectional shape of the through-hole is different to the base end cross-sectional shape;

injection molding of at least one cleaning element that fills the cavity portion and the through-hole with a plastic material, preferably a thermoplastic elastomer;

providing a third cavity comprising the front portion of the carrier with the injection molded cleaning element as an insert (the carrier with injection molded cleaning element may be transferred into the third mold cavity or a first mold half defining the second mold cavity may remain together with the carrier with the molded cleaning element and a new second mold half may be used to define the third mold cavity) and a cavity portion defining a back portion of the carrier; and injection molding of the back portion of the carrier.

The method may include one or several or all of the following optional steps:

choosing a plastic material for injection molding of the front portion of the carrier and choosing a plastic material for injection molding of the cleaning element, wherein both materials are chosen such that they form a chemical and/or physical bonding;

providing the pin for defining the through-hole having a shape such that the through-hole widens from the top end towards a middle portion or the bottom end of the through hole and/or providing the pin for defining the through-hole having a shape such that the through-hole comprises a widening step between the top end and the bottom end of the through hole;

providing at least one further pin for defining a further through-hole in the front portion of the carrier and injection molding the cleaning element and the further cleaning element and also filling of a cavity portion of the second mold cavity defining a channel that connects the bottom ends of the two cleaning elements.

The method to measure the retention force of an integral (or TPE) cleaning element analogously applies the method to measure the tuft retention force as provided by ISO 20126:2012+Amd 1:2018 ("Dentistry—Manual toothbrushes—General requirements and test methods"). The force range for measuring the retention force of integral/TPE cleaning elements is to be chosen such that the lower retention forces of an integral cleaning element can be reliably measured—the sensor may have a maximum force range value of 100 N.

An example integral cleaning element has a base end-cross-sectional area of the not embedded portion that is slightly arc-shaped and has a length of about 5 mm and a width of about 1 mm. The top end cross-sectional area of the embedded portion is wider by 0.3 mm in all directions—the top end cross-section area of the embedded portion is in this example about 80% larger than the base end cross-sectional area of the not embedded portion of the cleaning element. The material of the carrier was a polypropylene, specifically an unfilled polypropylene homopolymer for injection molding, and the TPE material of the integral cleaning element (a TPE-O, unfilled high performance thermoplastic elastomer with high flow rate) was having a hardness of 35 Shore A. The retention force of these cleaning elements was measured and a retention force of at least 3 N, typically of at least 4 N was found and most cleaning elements had a retention force of at least 5 N. In case the above mentioned 0.3 mm are reduced to 0.1 mm the increase area would be about 25% and in case of 0.2 mm this increased area would be about 50%. In case the not embedded portion would have a circular base end cross-sectional area having a diameter of 1 mm and the top end cross-sectional area would be by 0.3 mm, the increase would be 156%.

FIG. 1 is a cross-sectional cut through an example head 1 in accordance with the present disclosure. The head 1 has a carrier 100, a cleaning element 200 and a further cleaning element 300 that is of course optional and is used to discuss some aspects that are either alternative or additional aspects. The cleaning elements 200 and 300 are connected by a laterally extending arm 400. Further, the head 1 comprises an optional connector 500 that may be used to connect the head with a drive unit of a personal care device (see FIG. 4A for an example personal care device).

The carrier 100 has a front surface 1010 and a back surface 1020. The carrier 100 may be made from a front portion 101 and a back portion 102 that may be made in successive molding steps and this structure may serve to completely embed the cleaning elements 200 and 300 in the carrier 100 and/or to connect the carrier with the connector 500. As will be explained in more detail in connection with the manufacturing method with reference to FIGS. 3A to 3E further below, the front portion 101 of the carrier 100 has (while the back portion 102 is not yet made) a back surface 1011.

The cleaning element 200 shown on the left-hand side comprises a non-embedded portion 210 and an embedded portion 220, which embedded portion 220 means the portion of the cleaning element 200 that here is located within the carrier 100 and that ends on the level of the here flat front surface 1010 of the carrier 100. The non-embedded portion 210 of the cleaning element 200 has a base end 211 that extends from the front surface, i.e., from the level of the front surface, towards a free end 212 of the non-embedded portion 210 of the cleaning element 200. The base end 211 of the non-embedded portion 210 of the cleaning element 200 has a base end cross-sectional area and a base end cross-sectional shape in the level of the front surface 1010. Examples are discussed with reference to FIGS. 2A and 2B. The embedded portion 220 of the cleaning element 200 has a top end 221 that lies in the front surface 1010 of the carrier 100 and which top end 221 has a top end cross sectional area and a top end cross-sectional shape. Examples are again discussed with reference to FIGS. 2A and 2B. In accordance with the present disclosure, the top end cross-sectional area is larger than the base end cross-sectional area for the reasons as already discussed, namely improved chemical and/physical bonding between the embedded portion 220 of the cleaning element 200 and the carrier 100.

The embedded portion 220 of the cleaning element 200 has a bottom end 222 that is here completely embedded by the carrier 100. Between the top end 221 and the bottom end 222 a middle portion 223 extends. For the cleaning element 200, there is a widening step 224 provided in the middle portion 223, that is an essentially spontaneous widening the embedded portion 220 of the cleaning element 200 that increases the retention force needed to rip out the cleaning element 200 from the carrier 100 or to rip apart the cleaning element 200. The bottom end 222 of the embedded portion 220 of the cleaning element 200 may be connected, as is here shown, with a laterally extending arm 400 so that an arm section 410 extends between the bottom end 222 and a center section 430 of the laterally extending arm 400. The center section 430 may represent an injection point for the material from which the cleaning element 200 is made during the manufacturing of the head 1. The cleaning element 200 and the laterally extending arm 400 may thus be integral with each other. The laterally extending arm 400 may extend within a channel that is provided in the back side of the front portion 101 of the carrier 100.

The further cleaning element 300 shown on the right-hand side comprises a non-embedded portion 310 and an embedded portion 320, which embedded portion 320 means the portion of the further cleaning element 300 that here is located within the carrier 100 and that ends on the level of the here flat front surface 1010 of the carrier 100. The non-embedded portion 310 of the further cleaning element 300 has a base end 311 that extends from the front surface, i.e., from the level of the front surface, towards a free end 312 of the non-embedded portion 310 of the cleaning element 200. As is shown by way of example, the further cleaning element 300 (like any other cleaning element) may have a structure 313 to support cleaning of a surface such as a tooth surface. The base end 311 of the non-embedded portion 310 of the further cleaning element 300 has a base end cross-sectional area and a base end cross-sectional shape in the level of the front surface 1010. Examples are again discussed with reference to FIGS. 2A and 2B. The embedded portion 320 of the further cleaning element 300 has a top end 321 that lies in the front surface 1010 of the carrier 100 and which top end 321 has a top end cross sectional area and a top end cross-sectional shape. Examples are again discussed with reference to FIGS. 2A and 2B. In accordance with the present disclosure, the top end cross-sectional area is larger than the base end cross-sectional area for the reasons as already discussed, namely improved chemical and/physical bonding between the embedded portion 320 of the further cleaning element 300 and the carrier 100.

The embedded portion 320 of the further cleaning element 300 has a bottom end 322 that is here completely embedded by the carrier 100. Between the top end 321 and the bottom end 322 a middle portion 323 extends. For the further cleaning element 300, there is a widening 324 provided in the middle portion 323, that is an essentially continuous widening the embedded portion 320 of the further cleaning element 300 that increases the retention force needed to rip out the further cleaning element 300 from the carrier 100 or to rip apart the further cleaning element 300. The bottom end 322 of the embedded portion 320 of the further cleaning element 300 may be connected with a laterally extending arm 400 so that an arm section 420 extends between the bottom end 322 and a center section 430 of the laterally extending arm 400. The center section 430 may represent an injection point for the material from which the further cleaning element 300 is made during the manufacturing of the head 1. The further cleaning element 300 and the laterally extending arm 400 may thus be integral with each other. The laterally extending arm 400 may extend within a channel that is provided in the back side of the front portion 101 of the carrier 100. In the example shown in FIG. 1, the laterally extending arm 400 connects the bottom end 222 of the embedded portion 220 of the cleaning element and the bottom end 322 of the embedded portion 320 of the further cleaning element 300.

FIG. 2A is a cross-sectional cut through a first embodiment of a cleaning element 200A extending from a front surface 1010A of a carrier, where the cross-sectional cut was done in the plane of the front surface 1010A and the viewing direction is top-down as indicated by arrows in FIG. 1. In this top-down view, a base end cross-sectional area 215A and a base end cross-sectional shape 216A of a non-embedded portion 210A of the cleaning element 200A are shown. Further, a top end cross-sectional area 225A and a top end cross-sectional shape 226A of an embedded portion 220A of the cleaning element 200A are shown. In this example, the top end cross-sectional area 225A is larger than the base end cross-sectional area 215A and the first fully encompasses the latter. In this example, the top end cross-sectional shape 226A is circular and the base end cross-sectional shape 216A is circular as well and both are coaxially arranged, which is merely an optional positioning and they may as well be positioned in a non-coaxial manner.

FIG. 2B is a cross-sectional cut through a second embodiment of a cleaning element 200B extending from a front surface 1010B of a carrier, where the cross-sectional cut was done in the plane of the front surface 1010B and the viewing direction is top-down as indicated by arrows in FIG. 1. In this top-down view, a base end cross-sectional area 215B and a base end cross-sectional shape 216B of a non-embedded portion 210B of the cleaning element 200B are shown. Further, a top end cross-sectional area 225B and a top end cross-sectional shape 226B of an embedded portion 220B of the cleaning element 200B are shown. In this example, the top end cross-sectional area 225B is larger than the base end cross-sectional area 215B and the first fully encompasses the latter. In this example, the top end cross-sectional shape 226B is elliptical and the base end cross-sectional shape 216B is arc-like with a tapering towards one end (giving the impression of a Yin or Yang symbol).

The shapes shown in FIGS. 2A and 2B are exemplary only and the skilled person will be able to contemplate various other shapes like triangular, rectangular, star-like, banana-like, kidney-like, half-moon-like, trapezoidal etc.

FIGS. 3A to 3F are depictions of various manufacturing steps of making an example head for a personal care device in accordance with the present disclosure and of intermediate head products and of the final head.

Figure 3A:
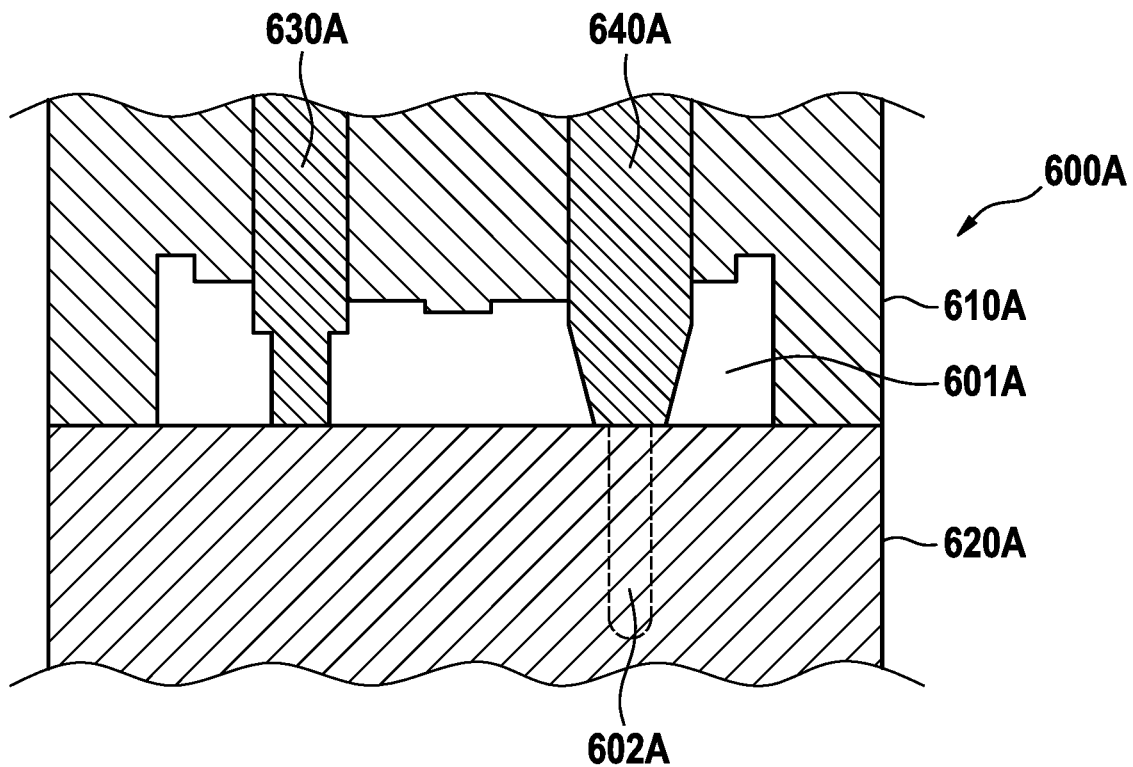
FIG. 3A is a schematic depiction of a first method of making a head in accordance with the present disclosure, the step comprising providing a first mold cavity for defining a front portion of a carrier having a through hole defined by a pin.

FIG. 3A is a cross-sectional cut through a schematically depicted mold 600A having a first mold half 610A and a second mold half 620A that define a first cavity 601A for injection molding of a front portion of a carrier. The separation line between the two mold halves 610A and 620A s indicated to coincide with a plane defining the front surface of the to be injection molded front portion of the carrier—this position of the separation line is understood to be non-limiting. In this example, two pins 630A and 640A extend into the first cavity 601A, which pins define through-holes in the front portion of the carrier. It is indicated by a dashed line that the second mold half 620A may comprise one or several cavity portions 602A for defining a non-embedded portion of a cleaning element. Such a cavity portion would then be sealed by a pin, as is here the case for pin 640A so that no plastic material would flow into cavity portion 602A during the injection of molten plastic material into the first cavity 601A. While in this cross-sectional cut two pins are shown, it should be understood that this is a non-limiting example shown for sake of presenting the concept and in some embodiments only one pin is used, while in other embodiments two or three or four etc. pins are used—just as many as injection molded cleaning elements are planned. This shall also not exclude that further cleaning elements made from, e.g., bundles of fibers are present on the carrier together with at least one of the injection molded cleaning elements.

Figure 3B:
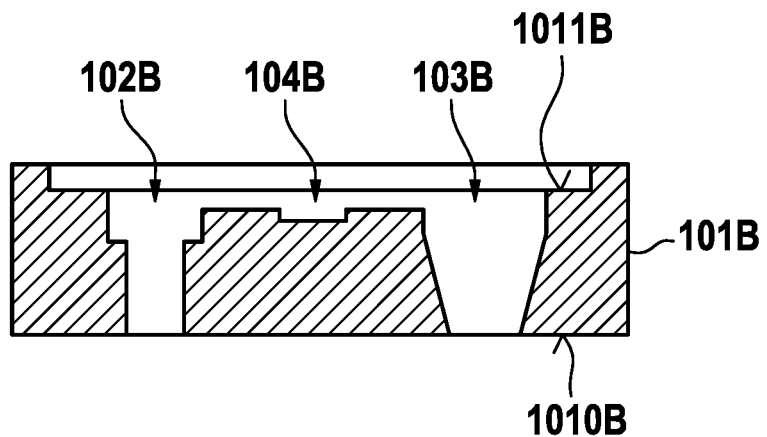
FIG. 3B is a schematic depiction of a first method of making a head in accordance with the present disclosure, the step comprising filling the first mold cavity.
Figure 3C:
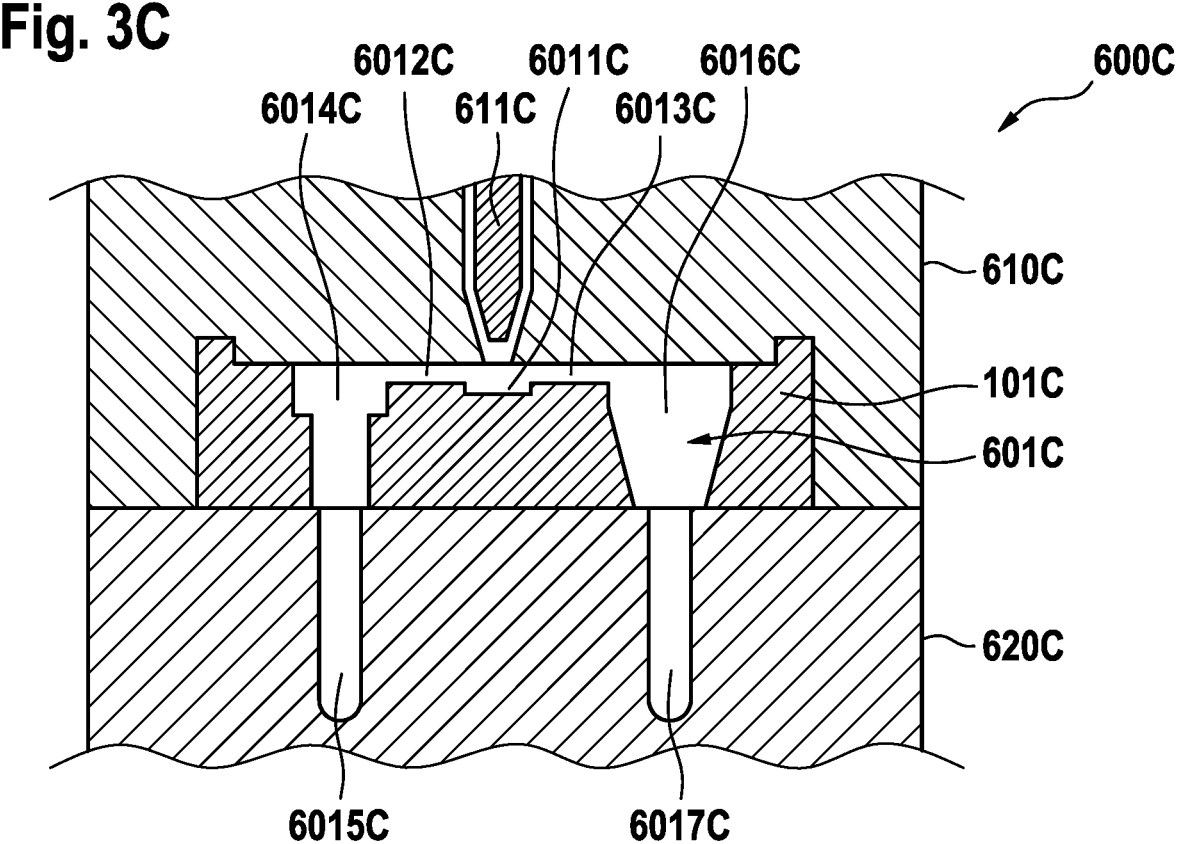
FIG. 3C is a schematic depiction of a first method of making a head in accordance with the present disclosure, the step comprising providing a second mold cavity having the front portion of the carrier molded as shown in FIG. 3B as an insert and comprising a cavity portion for defining a non-embedded portion of a cleaning element.

FIG. 3B is a cross-sectional cut through a front portion 101B of a carrier made by injecting molten plastic material into the first cavity 601A shown in FIG. 3A. The front portion 101B of the carrier has two through-holes 102B and 103B that extend between a front surface 1010B and a back surface 1011B of the front portion 101B of the carrier. A channel 104B connecting the two through holes 102B and 103B is shown in the back surface 1011B FIG. 3C is a cross-sectional cut through a schematically depicted mold 600C having a first mold half 610C and a second mold half 620C that define a second cavity 601C. A front portion 101C is inserted into the cavity 601C as an insert. It shall be understood that the front portion 101C may of course be the front portion 101B shown in FIG. 3B. The second cavity 601C with the inserted front portion 101C comprises several cavity portions 6011C to 6017C. A central channel cavity portion 6011C is provided on the backside of the front portion 101C of the carrier and two channel arms are defined by cavity portions 6012C and 6013C, which two arms cavity portions 6012C and 6013C connect the central channel cavity portion 6011C with through holes in the front portion 101C of the carrier, which through-holes define cavity portions 6014C and 6015C for molding of embedded portions of the cleaning elements. The second mold half 620C comprises here two cavity portions 6015C and 6016C that are aligned with the cavity portions 6014C and 6015C, respectively, and that allow to mold non-embedded portions of the cleaning elements. In FIG. 3 a injection nozzle 611C is indicated that is positioned in alignment with the central channel cavity portion 6011C, which is to be understood as a non-limiting example.

Figure 3D:
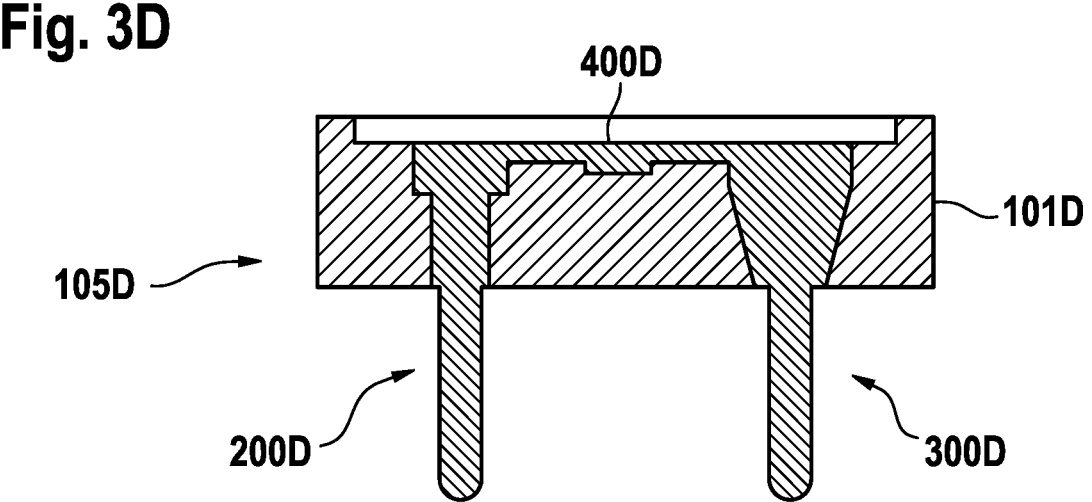
FIG. 3D is a schematic depiction of a first method of making a head in accordance with the present disclosure, the step comprising filling of the second mold cavity.

FIG. 3D is a cross-sectional cut through a pre-head 105D comprising a front portion of a carrier 101D and two cleaning elements 200D and 300D that may be the result from an injection molding step into the second cavity shown in FIG. 3C. The cleaning elements 200D and 300D are integrally connected by a laterally extending arm 400D on the backside of the front portion 101D. As was mentioned before, the plastic materials of the front portion 101D and of the cleaning elements 200D, 300D may be chosen such that the materials form and chemical and/or physical bond.

Figure 3E:
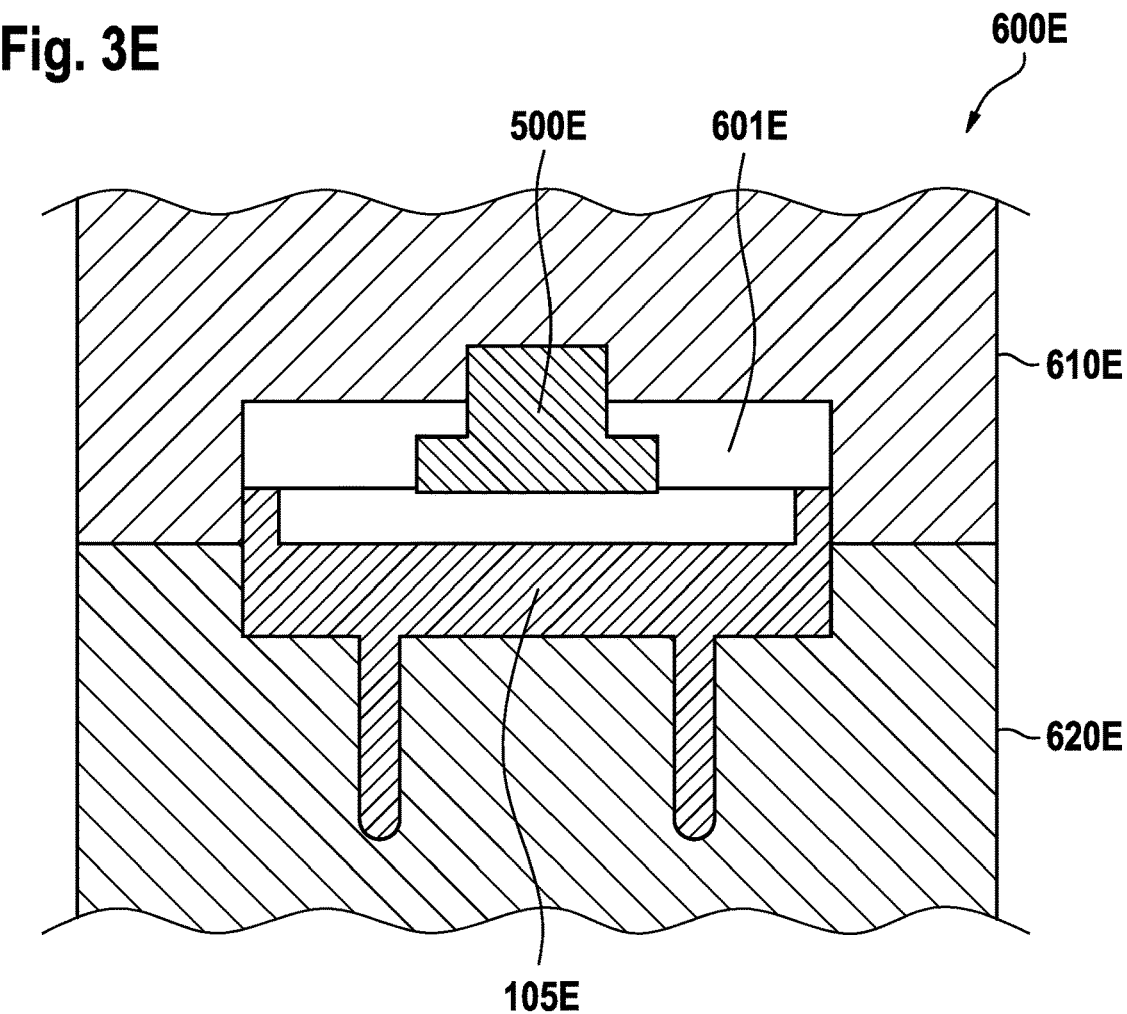
FIG. 3E is a schematic depiction of a first method of making a head in accordance with the present disclosure, the step comprising providing a third mold cavity having the front portion of the carrier molded as shown in FIG. 3D as an insert and comprising a cavity portion for defining a back portion of the carrier.

FIG. 3E is a cross-sectional cut through a schematically depicted mold 600E having a first mold half 610E and a second mold half 620E that define a third cavity 601E. A pre-head 105E is inserted into the third cavity as is a connector 500E that may serve to connect the final head to be molded with a drive mechanism. The pre-head 105E may be the pre-head 105D that is shown in FIG. 3D. Molten plastic material that will be injected into the third cavity 601E will connect the pre-head 105D and the connector 500D by a physical and/or chemical bond and/or by a positive fit. The material to be injected into the third cavity 601E forms a back portion of the carrier and completely embeds the embedded portion of the cleaning elements 200D and 300D as well as the laterally extending arm 400D.

Figure 3F:
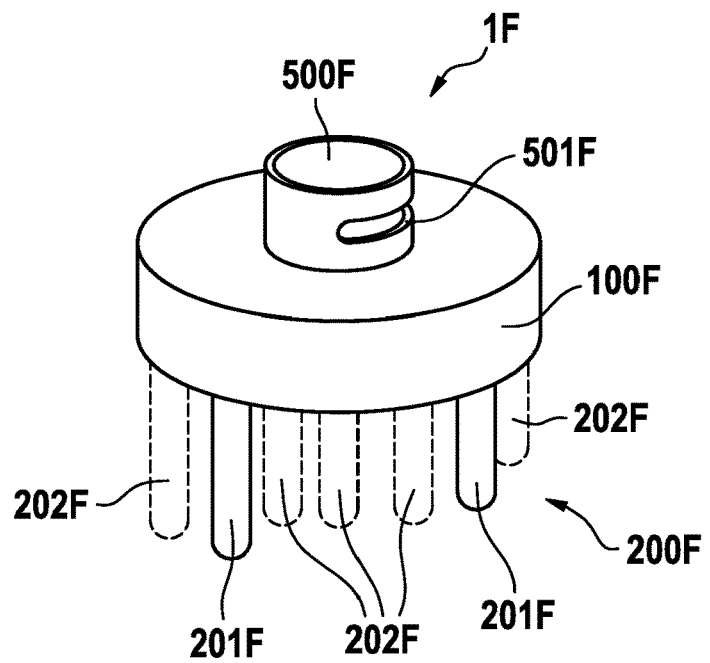
FIG. 3F is a schematic depiction of a first method of making a head in accordance with the present disclosure, the step comprising filling of the third mold cavity.

FIG. 3F is a depiction of a head IF that may result from the final injection molding step discussed with respect to FIG. 3E. The head IF comprises a carrier 100F, an array of cleaning elements 200F and a connector 500F. The connector 500F may comprise a connecting structure 501F to allow the connection with, e.g., a drive mechanism and/or with a locking mechanism (such as a locking pin) as is commonly known in the art. The array of cleaning elements 200F comprises two cleaning elements 201F shown in solid lines. It is here indicated by dashed lines that the head IF may comprise more than the two cleaning elements that were shown and discussed in the previous FIGS. 3A to 3E, namely additional cleaning elements 202F.

Figure 4A:
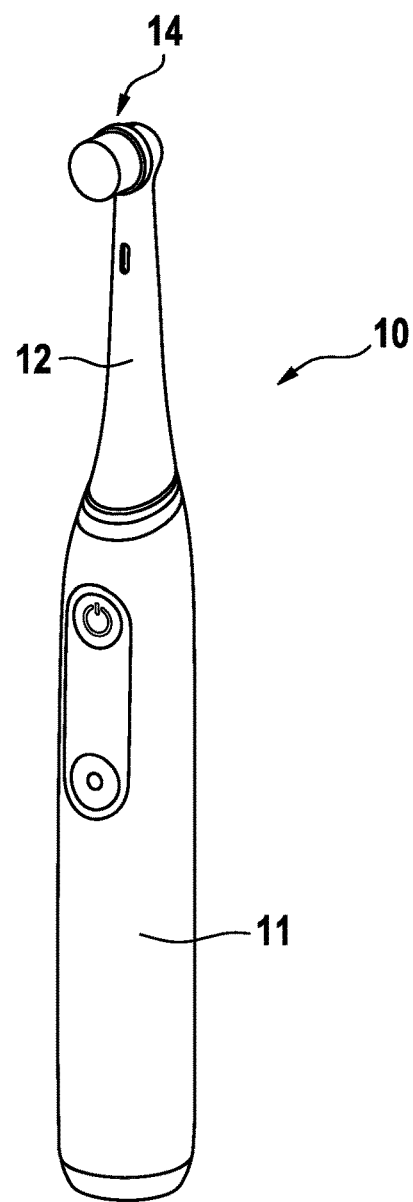
FIG. 4A is a depiction of a personal care device comprising a head in accordance with the present disclosure.

FIG. 4A is a depiction of a personal care device 10 realized as an electric toothbrush that comprises a handle section 11 and a replaceable attachment 12 at which a head 14 is provided, preferably a head in accordance with the present disclosure.

Figure 4B:
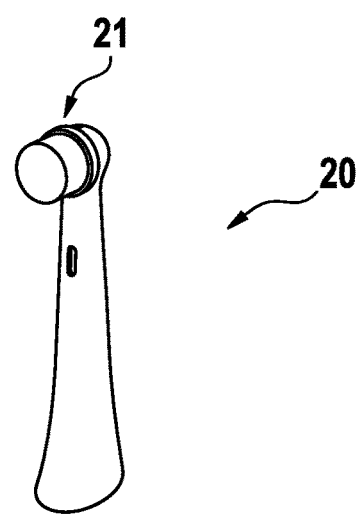
FIG. 4B is a depiction of a replaceable attachment for a personal care device comprising a head in accordance with the present disclosure.

FIG. 4B is a depiction of a replaceable attachment 20 realized as a replacement brush head for an electric toothbrush, which replaceable attachment 20 comprises a head 21, preferably a head in accordance with the present disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A head (1) for a personal care device comprising
a carrier (100) having a front surface (1010);
at least one integral cleaning element (200) partly embedded in the carrier (100) and thus having an embedded cleaning element portion (220) and a non-embedded cleaning element portion (210), the non-embedded cleaning element portion (210) extending from the front surface (1010) of the carrier (100) between a base end (211) on the front surface (1010) and a free end (212) and the embedded cleaning element portion (220)

extending from the front surface (1010) between a top end (221) on the front surface (1010) and a bottom end (222), wherein the base end (211) of the non-embedded cleaning element portion (210) has a base end cross-sectional shape and a base end cross-sectional area, and the top end (221) of the embedded cleaning element portion (220) has a top end cross-sectional shape that is different than the base end cross-sectional shape and a top end cross-sectional area that is larger than the base end cross-sectional area, and wherein an integral arm (410) connects the bottom end (222) of the embedded cleaning element portion (200) with a center point (430) in the carrier (100), the center point (430) being laterally displaced from the bottom end (222), the integral arm (410) being completely embedded in the carrier (100).

2. The head of claim 1, wherein the top end cross-sectional area (225A) of the embedded cleaning element portion (220) is larger by at least about 30% than the base end cross-sectional area (215A) of the non-embedded cleaning element portion (220).

3. The head of claim 1, wherein the cleaning element material is a thermoplastic elastomer.

4. The head of claim 1, wherein a material from which the embedded cleaning element portion (220) is made and a material from which the carrier (100) is made are chemically and/or physically bonded.

5. The head of claim 1, wherein the embedded cleaning element portion (320) widens from the top end (321) towards a middle portion (323) or the bottom end (322).

6. The head of claim 1, wherein the embedded cleaning element portion (220) comprises a widening step (224) between the top end (221) and the bottom end (222) of the embedded cleaning element portion (220).

7. The head of claim 1, wherein at least one further integral arm (420) connects the center point (430) and a bottom end (322) of an embedded cleaning element portion (320) of another cleaning element (300).

8. The head of one of claim 1, wherein a retention force of the cleaning element (200) is at least 3 Newton.

* * * * *